2,967,204

HYDROGENATION OF AROMATICS WITH A TUNGSTEN AND NICKEL SULFIDE, SUPPORTED ON ALUMINA, CATALYST COMPOSITE

Harold Beuther and Richard A. Flinn, Penn Hills Township, Allegheny County, and Joseph B. McKinley, New Kensington, Pa., assignors to Gulf Research & Development Company, Pittsburgh, Pa., a corporation of Delaware No Drawing. Filed Aug. 4, 1958, Ser. No. 753,109

2 Claims. (Cl. 260—667)

This invention relates to catalysts and processes for the saturative hydrogenation of aromatics existing either alone or in admixture with other substances.

Many hydrocarbon stocks, such as jet fuels, diesel fuels, gas turbine fuels, kerosenes, furnace oils, lubricating oils, etc., can be upgraded by the saturative hydrogenation of the aromatic constituents they contain. For example, furnace oil distillates from cracking processes usually contain a relatively large percentage of aromatic compounds, in addition to having relatively high sulfur and olefin contents. Although the common commercial hydrogen refining processes result in considerable improvement in the quality of these oils, including removal of sulfur and hydrogenation of olefins, their aromatic contents remain substantially unchanged. Since aromatic compounds in general have poor burning characteristics, conversion of the aromatics in such cracked distillates to the corresponding naphthenes is desirable for further improvement in quality. In the case of jet fuels, it is desirable to convert aromatic compounds to the corresponding naphthenes because of the higher heats of combustion of the saturated compounds. Accordingly, this invention is directed to the saturative hydrogenation of aromatics. By the term saturative hydrogenation of aromatics we refer to the addition of hydrogen to the aromatic portions of a molecule rather than the addition of hydrogen to olefinic portions of a molecule, although the two may occur concomitantly.

According to this invention, extremely high conversions in the saturative hydrogenation of aromatics are achieved by passing an aromatic containing material and hydrogen at a temperature of 550° to 850° F. generally and 650° to 750° F. preferably and at a pressure of 500 to 4000 pounds per square inch gauge over a catalyst comprising the oxides or sulfides of tungsten and an oxide or sulfide of at least one metal selected from group VIII. The preferable group VIII metals are iron, cobalt and nickel, generally and the most preferable group VIII metal is nickel. The catalyst may be supported or unsupported, but is preferably disposed upon a suitable supporting material. Examples of materials suitable to be employed as supports are alumina, silica, magnesia, zirconia, kieselguhr, pumice, etc. In the supported catalysts of this invention, the active metals can be present either in the oxide form or they can be at least partially sulfided. Since the conversion of certain oxides, particularly those of tungsten, to the corresponding sulfides proceeds very slowly a sulfiding treatment of any reasonable length does not convert the oxides completely to sulfides. The product of a sulfiding treatment of metal oxides is generally a mixture of sulfides, oxides, oxysulfides, free metals and free sulfur.

The optimum total active metals content in the supported catalysts will be dependent upon whether these metals are present in the oxided or sulfided state. The supported oxided catalyst has a different optimum metals content than the supported sulfided form. The oxide catalyst should contain 5 to 40 percent metals by weight generally, expressed as pure metals, and preferably between 20 and 28 percent metals. When the catalyst is employed in the sulfided state, it should contain 5 to 40 percent metals by weight generally and preferably it should contain 10 to 25 percent metals. In the case of both the oxided and sulfided supported catalysts, as well as for the unsupported catalysts, the atomic ratio of tungsten to group VIII metal should be 0.2:1 to 5.0:1 generally, but the preferable ratio is 0.8:1 to 1.2:1. The sulfided supported catalysts of this invention can contain between 0.5 and 15 percent sulfur by weight.

The unsupported catalyst of this invention can be prepared by any suitable method. For example, a solution of ammonium sulfide and the ammonium thio salt of a group VI element is prepared by treating an ammoniacal solution of an ammonium salt of a group VI metal with hydrogen sulfide. A group VIII salt is then added to this solution to obtain a group VIII metal sulfide precipitate. Following this the group VI metal sulfide is precipitated by acidifying the medium. Thereafter the mixed sulfides are recovered and subjected to reducing conditions and then converted into a form suitable as a catalyst.

In the preparation of the supported catalyst compositions of this invention, the carrier material is impregnated with one or more solutions containing soluble compounds of the active metals, such as ammonium meta tungstate and nickel nitrate. The proportions of such soluble compounds placed in solution are adjusted to produce a catalyst containing the desired amount of metals and the desired ratio of metals to each other. Either single or multiple impregnation of the carrier with the solution or solutions containing the active metals can be employed. The preferable method of preparing the supported catalyst is by multiple impregnation wherein the tungsten is impregnated upon the support before the group VIII metal or metals. We have found that impregnating the tungsten upon the support before the impregnation of the group VIII metal or metals produces a catalyst possessing superior activity in the saturative hydrogenation of aromatics. The impregnated support is then dried, calcined and preferablby sulfided.

The sulfiding step in the preparation of the supported catalysts of this invention is a solid phase reaction. The impregnated carrier can be treated with a gaseous or liquid sulfur containing substance, preferably in the presence of a reducing material such as hydrogen, by exposing the outer surface and pores of the impregnated carrier to the sulfur containing material. Hydrogen sulfide is the preferred sulfur containing material. Examples of other sulfur containing materials are methyl sulfide, propyl sulfide, ammonium sulfide, propyl mercaptan, etc. As explained above, the sulfiding treatment only partially converts the oxides to the sulfides and the product of the sulfiding step is a mixture of sulfides, oxides, oxysulfides and free sulfur.

If the supported catalyst is sulfided, the sulfiding operation should preferably employ a hydrogen sulfide containing mixture such as hydrogen-hydrogen sulfide comprising 1 to 99 volume percent hydrogen sulfide (measured at 60° F. and atmospheric pressure) at a temperature of 500° to 750° F. for a duration of 2 to 20 hours. It is preferred that the sulfiding conditions should include a hydrogen-hydrogen sulfide containing mixture having a volumetric ratio of hydrogen to hydrogen sulfide of 2 to 12, a temperature of 600 to 700° F. and a sulfiding time duration of 4 to 12 hours.

Oxides or sulfides of group VI metals, generally, in combination with oxides or sulfides of group VIII metals are effective catalysts for the saturative hydrogenation of aromatic constituents. Such group VI metal containing catalysts are generally effective for the saturation of aromatic constituents at temperatures of approximately 570 to 850° F. and pressures of about 300 pounds per square inch gauge. We have now discovered that when tungsten is chosen as the group VI metal in these catalysts, highly superior conversions are achieved by employing a hydrogenation pressure above 300 pounds per square inch gauge without any appreciable change in the temperature conditions. Generally, when tungsten containing catalysts are employed, greatly increased conversions are achieved by employing a pressure range of from 500 to 4000 pounds per square inch gauge. The surprising discovery has now been made that these greatly superior conversions are achieved by operating in this pressure range only when tungsten is present in the catalyst. In accordance with our invention, the beneficial effect accompanying an increase in hydrogenation pressure can best be achieved when employing a tungsten containing catalyst. Much less improvement in saturative hydrogenation activity is achieved at the elevated pressures of this invention when employing catalyst compositions containing other group VI metals in place of tungsten.

The increased activity achieved when employing a tungsten containing catalyst of this invention at elevated pressures is illustrated in Table 1. Table 1 presents the activities of the catalysts tested for the saturation of aromatics in terms of a relative activity scale which was devised to conveniently compare the test data obtained by the use of various catalyst. This scale employs refractive index, $n$, as a measure of the aromatic content of a solution since the refractive index and aromatic content vary almost lineally over the range in which we are interested. Therefore, this scale of relative activity was devised so that a product having a refractive index equal to that of the charge was considered to have passed over a catalyst of activity 0 and the same charge, when converted into a product having a refractive index corresponding to complete saturation of its aromatic content, was considered to have passed over a catalyst of activity 1000. Thus, $$\text{Relative activity} = 1000 \frac{n_{product} - n_{charge}}{n_{saturated\ product} - n_{charge}}$$

TABLE 1

*The effect of pressure on saturation activity of several catalysts*

| Catalyst Description | | Unsulfided NiW-Alumina |  |
|---|---|---|---|
| Total Metals, Percent | | 25.64 | |
| Atomic Ratio | | 1.01 Ni:1.00 W | |
| Support | | Alcoa H-44 Alumina | |
| Impregnation Technique (Vacuum) | | Single | |
| | Charge—FCC Furnace Oil Distillate | | |
| Conditions: | | | |
| Hydrogen Rate, s.c.f./Bbl | | 3,630 | 5,000 |
| Avg. Temperature, ° F | | 700 | 701 |
| Pressure, p.s.i.g | | 990 | 3,020 |
| Liquid Hourly Space Velocity, Vol./Hr./Vol | | 1.12 | 1.14 |
| Throughput, Vol./Vol | | 22.4 | 9.1 |
| Balance, Percent by Wt. of Charge: | | | |
| Hydrocarbon Gases ($C_1$-$C_3$) | | 0.3 | 0.1 |
| Liquid | | 99.2 | 97.6 |
| Sulfur removed | | 1.5 | 1.5 |
| Total | | 101.0 | 99.2 |
| Liquid Product Inspection: | | | |
| Gravity, ° API | 24.3 | 31.7 | 34.7 |
| Sulfur, GRM 1123, Percent | 1.55 | <0.04 | 0.04 |
| Bromine No.— ASTM D 1159 | 27.7 | | 1.0 |
| FIA Analysis, Percent by Vol.— ASTM D 1319: | | | |
| Olefins | 14.2 | 1.1 | 0.8 |
| Aromatics | 59.5 | 41.3 | 14.9 |
| Saturates | 26.3 | 57.6 | 84.3 |
| Aniline Point, ° F.— ASTM D 611 | 83.2 | 111.8 | 145.3 |
| Distillation, Gas Oil— ASTM D 158: | | | |
| Over Point, ° F | 416 | 290 | 352 |
| End Point, ° F | 640 | 600 | 629 |
| 10% at, ° F | 467 | 439 | 426 |
| 30 | 494 | 464 | 457 |
| 50 | 521 | 492 | 485 |
| 70 | 552 | 528 | 520 |
| 90 | 595 | 578 | 573 |
| Recovery, Percent | 98.5 | 98.1 | 98.0 |
| Residue, Percent | 1.3 | 1.3 | 1.5 |
| Avg. No. Rings per molecule | 1.64 | 1.58 | 1.50 |
| Avg. No. Aromatic Rings per molecule | 0.95 | 0.46 | 0.14 |
| Refractive Index, $n_D^{20}$ | 1.5169 | 1.4822 | 1.4673 |
| Catalyst Relative Activity | | 589 | 860 |

| Catalyst Description | | Tungsten-Nickel Sulfide | |
|---|---|---|---|
| Total Metals, Percent | | 19.9% Ni:43.3% W:29.6% S | |
| Atomic Ratio | | 1.44 Ni:1.00 W | |
| Support | | Unsupported | |
| Impregnation Technique (Vacuum) | | | |
| Conditions: | | | |
| Hydrogen Rate, s.c.f./Bbl | | 3,900 | 3,920 |
| Avg. Temperature, ° F | | 700 | 700 |
| Pressure, p.s.i.g | | 1,000 | 3,020 |
| Liquid Hourly Space Velocity, Vol./Hr./Vol | | 1.04 | 0.98 |
| Throughput, Vol./Vol | | 100.3 | 19.6 |
| Balance, Percent by Wt. of Charge: | | | |
| Hydrocarbon Gases ($C_1$-$C_3$) | | 0.5 | 0.9 |
| Liquid | | 100.1 | 100.4 |
| Sulfur Removed | | 2.0 | 1.5 |
| Total | | 102.6 | 102.8 |
| Liquid Product Inspection: | | | |
| Gravity, ° API | | 32.9 | 37.4 |
| Sulfur, GRM 1123, Percent | | 0.08 | <0.04 |
| Bromine No.— ASTM D 1159 | | 3.2 | 0.5 |
| FIA Analysis, Percent by Vol.— ASTM D 1319: | | | |
| Olefins | | 2.5 | 3.0 |
| Aromatics | | 38.9 | 1.5 |
| Saturates | | 58.6 | 95.5 |
| Aniline Point, ° F.— ASTM D 611 | | 115.0 | 161.6 |
| Distillation, Gas Oil— ASTM D 158: | | | |
| Over Point, ° F | | 328 | 352 |
| End Point, ° F | | 646 | 636 |
| 10% at, ° F | | 416 | 418 |
| 30 | | 445 | 446 |
| 50 | | 472 | 476 |
| 70 | | 507 | 514 |
| 90 | | 570 | 570 |
| Recovery, Percent | | 98.4 | 99.0 |
| Residue, Percent | | 1.1 | 1.0 |
| Average No. Rings per molecule | | 1.58 | 1.60 |
| Average No. Aromatic Rings per molecule | | 0.35 | 0.00 |
| Refractive Index, $n_D^{20}$ | | 1.4763 | 1.4580 |
| Catalyst Relative Activity | | 689 | 1,000 |

TABLE 1—Continued

| Catalyst Description | Sulfided NiW-Alumina |  |
|---|---|---|
| Total Metals, Percent | 24.48 | |
| Atomic Ratio | 1.07 Ni:1.00 W | |
| Support | Alcoa H-44 Alumina | |
| Impregnation Technique (Vacuum) | Single | |
| Conditions: | | |
| Hydrogen Rate, s.c.f./Bbl | 3,820 | 4,340 |
| Avg. Temperature, °F | 696 | 701 |
| Pressure, p.s.i.g | 1,000 | 2,980 |
| Liquid Hourly Space Velocity, Vol./Hr./Vol | 1.09 | 0.95 |
| Throughput, Vol./Vol | 21.8 | 19.1 |
| Balance, Percent by Wt. of Charge: | | |
| Hydrocarbon Gases ($C_1$-$C_3$) | 0.2 | 0.3 |
| Liquid | 97.8 | 102.3 |
| Sulfur Removed | 1.5 | 1.5 |
| Total | 99.5 | 104.1 |
| Liquid Product Inspection: | | |
| Gravity, °API | 31.8 | 36.4 |
| Sulfur, GRM 1123, Percent | <0.04 | <0.04 |
| Bromine No.— | | |
| ASTM D 1159 | 3.4 | 0.6 |
| FIA Analysis, Percent by Vol.— | | |
| ASTM D 1319: | | |
| Olefins | 1.4 | 3.8 |
| Aromatics | 41.1 | 10.7 |
| Saturates | 57.5 | 85.5 |
| Aniline Point, °F.— | | |
| ASTM D 611 | 117.2 | 149.9 |
| Distillation, Gas Oil— | | |
| ASTM D 158: | | |
| Over Point, °F | 346 | 276 |
| End Point, °F | 642 | 632 |
| 10% at, °F | 437 | 416 |
| 30 | 468 | 452 |
| 50 | 498 | 481 |
| 70 | 533 | 513 |
| 90 | 584 | 572 |
| Recovery, Percent | 98.6 | 98.5 |
| Residue, Percent | 1.2 | 1.3 |
| Avg. No. Rings per molecule | 1.59 | 1.50 |
| Avg. No. Aromatic Rings per molecule | 0.43 | 0.10 |
| Refractive Index, $n_D^{20}$ | 1.4811 | 1.4627 |
| Catalyst Relative Activity | 608 | 920 |

| Catalyst Description | Unsulfided CoMo-Alumina | |
|---|---|---|
| Total Metals, Percent | 12.54 | 10.01 |
| Atomic Ratio | 0.39 Co: 1.00 Mo | 0.44 Co: 1.00 Mo |
| Support | Alumina | Alcoa F-10 Alumina |
| Impregnation Technique (Vacuum) | Coprecipitated | Double |
| Conditions: | | |
| Hydrogen Rate, s.c.f./Bbl | 4,100 | 3,660 |
| Avg. Temperature, °F | 702 | 702 |
| Pressure, p.s.i.g | 3,000 | 1,000 |
| Liquid Hourly Space Velocity, Vol./Hr./Vol | 1.03 | 1.04 |
| Throughput, Vol./Vol | 12.4 | 20.9 |
| Balance, Percent by Wt. of Charge: | | |
| Hydrocarbon Gases ($C_1$-$C_3$) | 0.7 | 0.2 |
| Liquid | 97.6 | 99.4 |
| Sulfur Removed | 1.9 | 1.5 |
| Total | 100.2 | 101.1 |
| Liquid Product Inspection: | | |
| Gravity, °API | 30.1 | 30.5 |
| Sulfur, GRM 1123, Percent | 0.21 | <0.04 |
| Bromine No.— | | |
| ASTM D 1159 | 4.9 | |
| FIA Analysis, Percent by Vol.— | | |
| ASTM D 1319: | | |
| Olefins | 1.6 | 2.1 |
| Aromatics | 52.5 | 50.8 |
| Saturates | 46.2 | 47.1 |
| Aniline Point, °F.— | | |
| ASTM D 611 | 103.3 | 101.0 |
| Distillation, Gas Oil— | | |
| ASTM D 158: | | |
| Over Point, °F | 364 | 333 |
| End Point, °F | 633 | 629 |
| 10% at, °F | 440 | 432 |
| 30 | 472 | 465 |
| 50 | 503 | 491 |
| 70 | 540 | 526 |
| 90 | 590 | 573 |
| Recovery, Percent | 98.7 | 98.6 |
| Residue, Percent | 1.2 | 1.0 |
| Average No. Rings per molecule | | 1.60 |
| Avg. No. Aromatic Rings per molecule | | 0.59 |
| Refractive Index, $n_D^{20}$ | 1.4892 | 1.4884 |
| Catalyst Relative Activity | 470 | 483 |

TABLE 1—Continued

| Catalyst Description | Sulfided CoW Alumina | Sulfided CoW Alumina |
|---|---|---|
| Total Metals, Percent | 25.4 | 13.4 |
| Atomic Ratio | 0.8 Co: 1.0 W | 0.8 Co: 1.0 W |
| Support | Alcoa H-44 Alumina | Alcoa H-42 Alumina |
| Impregnation Technique (Vacuum) | | |
| Conditions: | | |
| Hydrogen Rate: s.c.f./Bbl | 4,360 | 3,760 |
| Avg. Temperature, °F | 701 | 696 |
| Pressure, p.s.i.g | 1,000 | 3,000 |
| Liquid Hourly Space Velocity, Vol./Hr./Vol | 1.01 | 1.08 |
| Throughput, Vol./Vol | 20.3 | 8.6 |
| Balance, Percent by Wt. of Charge: | | |
| Hydrocarbon Gases ($C_1$-$C_3$) | 0.2 | 0.7 |
| Liquid | 99.3 | 100.3 |
| Sulfur Removed | 1.5 | 1.5 |
| Total | 101.0 | 102.5 |
| Liquid Product Inspection: | | |
| Gravity, °API | 30.5 | 34.6 |
| Sulfur, GRM 1123, Percent | <0.04 | <0.04 |
| Bromine No.— | | |
| ASTM D 1159 | 3.7 | 1.3 |
| FIA Analysis, Percent by Vol.— | | |
| ASTM D 1319: | | |
| Olefins | 1.6 | 1.7 |
| Aromatics | 50.6 | 24.4 |
| Saturates | 47.8 | 73.9 |
| Aniline Point, °F.— | | |
| ASTM D 611 | 103.9 | 137.1 |
| Distillation, Gas Oil— | | |
| ASTM D 158: | | |
| Over Point, °F | 348 | 307 |
| End Point, °F | 640 | 641 |
| 10% at, °F | 440 | 424 |
| 30 | | |
| 50 | | |
| 70 | | |
| 90 | | |
| Recovery, Percent | 98.0 | 98.5 |
| Residue, Percent | 1.4 | 1.3 |
| Average No. Rings per molecule | 1.61 | 1.55 |
| Average No. Aromatic Rings per Molecule | 0.56 | 0.21 |
| Refractive Index, $n_D^{20}$ | 1.4872 | 1.4695 |
| Catalyst Relative Activity | 504 | 898 |

As shown in Table 1, the relative activity for the saturation of aromatics for both the supported and unsupported tungsten containing catalysts of this invention increases sharply with an increase in hydrogenation pressure. Table 1 shows that the activity of a 24.48 percent sulfided nickel-tungsten catalyst disposed upon a support designated as H-44 alumina and manufactured by the Aluminum Company of America increases from a value of 608 at a hydrogenation pressure of 1000 pounds per square inch gauge to a value of 920 at a hydrogenation pressure of 2980 pounds per square inch gauge, while unsupported nickel-tungsten sulfide increases from a value of 689 at a hydrogenation pressure of 1000 pounds per square inch gauge to a value of 1000 at a hydrogenation pressure of 3020 pounds per square inch gauge. Unsulfided 25.64 percent nickel-tungsten on H-44 alumina has an activity of 589 at a hydrogenation pressure of 990 pounds per square inch gauge and an activity of 860 at a hydrogenation pressure of 3020 pounds per square inch gauge. Table 1 also shows that a sulfided 25.4 percent cobalt-tungsten on H-44 alumina catalyst has an activity of 504 at 1000 pounds per square inch gauge and that a sulfided 13.4 percent cobalt-tungsten on H-42 alumina catalyst has an activity of 898 at 3000 pounds per square inch gauge. In respect to a non-tungsten containing catalyst, on the other hand, an unsulfided cobalt-molybdenum on H-44 alumina has an activity of 483 at a hydrogenation pressure of 1000 pounds per square inch and this activity does not increase with pressure, but is approximately the same (470) at a hydrogenation pressure of 3000 pounds per square inch gauge.

In addition to showing that catalysts containing tungsten and a group VIII metal exhibit highly superior aromatic saturation activities and that such catalysts are especially sensitive to elevations in pressure, Table 1 also shows that a further advantage is achieved by employing nickel as a group VIII metal. For example, sulfided 24.48 percent nickel-tungsten on alumina has an activity of 608 at 1000 pounds per square inch gauge while sulfided 10.01 percent cobalt-tungsten on alumina exhibits a lower activity of 504 at 1000 pounds per square inch gauge. Again, this same nickel-tungsten catalyst has an activity of 920 at approximately 3000 pounds per square inch gauge while the cobalt-tungsten catalyst exhibits a somewhat lower activity of 898 at 3000 pounds per square inch gauge. Accordingly, it is seen that it is advantageous to employ nickel as a group VIII metal in the catalysts of this invention.

It has been found that the tungsten-containing catalysts of this invention are most responsive to increases in pressure in the range between 500 and 1000 pounds per square inch gauge. At pressures above 1000 pounds per square inch gauge up to approximately 4000 pounds per square inch gauge these catalysts are somewhat less responsive to pressure changes than in the 500 to 1000 pounds per square inch gauge range. The catalysts of this invention exert a very small activity for aromatic saturation at pressures below 50 pounds per square inch gauge. Accordingly, when an aromatic-containing charge is treated according to the method of this invention only a minor amount of aromatic saturation will occur at pressures below 500 pounds per square inch gauge. At saturation pressures between 500 and 1000 pounds per square inch gauge the greatest portion of the aromatics present will be saturated. Increasing the pressure from 1000 to 3000 or 4000 pounds per square inch gauge will accomplish substantially complete saturation of the aromatics present.

The data in Table 2 illustrate the effect of incremental changes in pressure upon aromatic saturation activity when employing a tungsten-containing catalyst of this invention. The data in Table 2 were obtained by employing a presulfided catalyst comprising 4.9 weight percent nickel and 15.9 weight percent tungsten on H-44 alumina for the saturation of the aromatics present in a light catalytic gas oil at 700° F., 1.0 liquid volume of charge per hour per volume of catalyst and 4000 standard cubic feet of hydrogen per barrel. The charge contained 59.5 percent aromatics. Table 2 indicates the aromatic content of the product of saturation processes carried out on this charge at the various pressures indicated.

TABLE 2

*Effect of pressure on the saturation activity of a tungsten-containing catalyst*

| Pressure—Pounds per square inch gauge | Aromatic content, Percent | Percent Decrease in Aromatics |
| --- | --- | --- |
| charge | 59.5 | |
| 500 | 57.6 | 3.2 |
| 1,000 | 26.0 | 56.3 |
| 2,000 | 25.3 | 57.5 |
| 3,000 | 14.6 | 75.4 |
| 3,500 | 10.7 | 82.0 |

Table 2 shows that at 500 pounds per square inch gauge the saturation process resulted in only a 3.2 percent decrease in the percent aromatics present. However, when employing a saturation pressure of 1,000 pounds per square inch gauge the amount of aromatics present decreased 56.3 percent. Increasing the pressure to 2,000, 3,000 and 3,500 pounds per square inch gauge only increased the amount of saturation to 57.5, 75.4 and 82.0 percent, respectively. Accordingly, only 3 percent of the aromatics were saturated at pressures up to 500 p.s.i.g. while 53 percent of the aromatics present were saturated at pressures between 500 and 1000 p.s.i.g. Increasing the pressure from 1000 to 3500 p.s.i.g. resulted in the saturation of only an additional 26 percent of the aromatics. It is, therefore, seen that the first 500 pounds of pressure results in the smallest decrease in amount of aromatics per unit of pressure applied, whereas the amount of saturation occurring per unit of pressure applied between 500 and 1000 is the greatest. The amount of saturation occurring per unit of pressure is much greater above 1000 pounds than below 500 pounds but not as great as in the interval between 500 and 1000 pounds.

An additional test was made to further illustrate the advantage of employing a tungsten-containing catalyst. In this additional test a non-tungsten containing catalyst comprising 19.7 percent of nickel and molybdenum on H-44 alumina was employed to saturate aromatics in the same feed stock and under the same conditions as indicated for the tests made to obtain the data in Table 2. In this test the feed stock was treated at 1000 pounds per square inch gauge and the amount of aromatics decreased from 59.5 percent to only 39.1 percent. This is contrasted to the data shown in Table 2 where, when a tungsten-containing catalyst was employed, the amount of aromatics decreased from 59.5 percent to 26.0 percent at a saturation pressure of 1000 pounds per square inch gauge.

The temperature range to be employed in the aromatic saturation processes of this invention is 550 to 850° F. Even at elevated pressures of approximately 3000 p.s.i.g. only minor amounts of aromatics will be saturated at temperatures in the lower portion of this range. When hydrogenation temperatures in the upper portion of this range are employed at elevated pressures near 3000 p.s.i.g. in the presence of the preferred catalysts of this invention, substantially all the aromatics present will be saturated. For example, when employing a nickel-tungsten sulfide catalyst at 3000 p.s.i.g. and a space velocity of 1.0 liquid volume of charge per hour per volume of catalyst for the hydrogenation of the aromatics present in a fluid catalytically cracked furnace oil distillate containing 61.0 percent by volume of aromatics, the total aromatic content was only reduced to 53.5 percent at a hydrogenation temperature of 555° F. However, at a temperature of 715° F. the aromatic content of this charge was reduced from 61.1 percent by volume to only 4.5 percent by volume, the other conditions remaining the same.

Higher temperatures are required when non-tungsten containing catalysts are employed. For example, when employing a cobalt-molybdenum alumina catalyst for the saturation of the aromatics in a portion of the same charge under the same reaction conditions the aromatic content of the charge was reduced from 61.1 percent by volume to only 52.5 percent by volume at a hydrogenation temperature of 700° F. Accordingly, it is seen that temperatures of at least 550° F. are necessary for the hydrogenative saturation of aromatics in accordance with this invention and that substantially higher temperatures are required when non-tungsten containing catalysts are employed.

The oxide supported catalysts of this invention should contains 5 to 40 percent metals generally, expressed as pure metals, and preferably between 20 and 28 percent metals. When the supported catalysts of this invention are employed in the sulfided state, they should contain 5 to 40 percent metals generally and preferably the sulfided supported catalysts of this invention should contain 10 to 25 percent metals.

Table 3 presents data illustrating the optimum metals content of nickel-tungsten-alumina catalysts. Table 3 shows the results of tests made with catalysts having varying amounts of nickel-plus-tungsten upon alumina. The tests were made for alumina-supported catalysts having either nickel and tungsten oxides or nickel and tungsten sulfides. In each case, 1:1 atomic ratios of nickel-to-tungsten were used. Both the oxide catalyst and the sulfide catalyst were tested using a fluid catalytically cracked furnace oil as a charge at a space velocity of 1 liquid volume of charge per hour per volume of catalyst and at 1000 pounds per square inch gauge and 700° F. with 4000 standard cubic feet of hydrogen per barrel.

TABLE 3

*Relative activity of nickel-tungsten-alumina catalysts having varying amounts of active metals*

| Weight percent Nickel plus Tungsten at a 1:1 atomic ratio | Oxided | Sulfided |
|---|---|---|
| 15.7 | 520 | 605 |
| 21.3 | 570 | 630 |
| 25.6 | 589 | 605 |
| 34.6 | 531 | |

Table 3 indicates that a high saturation activity exists at a total metals content of about 25 percent of the total catalyst weight, expressed as pure metals, in the case of the oxided catalyst. It is also seen from Table 3 that in the case of a sulfided catalyst a high activity is achieved when employing about a 21 weight percent nickel-tungsten on alumina catalyst. This shift in maximum activity with conversion from the oxide to the sulfide probably occurs because activity improvement brought about by sulfiding increases as the quantity of active metals on the catalyst decreases.

The alumina support employed in the tests illustrated on Table 3 is the H-44 support manufactured by the Aluminum Company of America. However, the nature of the supporting material is not critical. The preferred total metals content for either the oxided or sulfided catalysts of this invention is not limited to any particular support but is representative of the preferred metals content for the catalysts of this invention when employing any suitable porous supporting material having a surface area of 10 to 500 square meters per gram. Carriers within this range possess pore structure characteristics such that the amounts of active metals as specified in this invention may be impregnated upon their surfaces without causing pore plugging which would eliminate a large amount of active catalytic surface and thus cut down the activity of the catalyst.

Although the supported catalysts of this invention can be employed in the oxide form, it has been found that sulfiding effects a significant increase in activity. Certain variables of the sulfiding operation have been found to be critical to the amount of activity increase resulting from sulfiding these catalysts. The variables found to be critical are the composition of the sulfiding gas stream, the sulfiding temperature and the sulfiding time duration.

Table 4 presents a comparison of activity for the saturation of aromatics for catalyst samples sulfided at the temperatures indicated with the activity of an unsulfided catalyst as a reference. All the catalyst samples employed in obtaining the data shown in Table 4 were sulfided for four hours with a gas having a hydrogen-to-hydrogen sulfide volume ratio of 12:1 at the various temperatures indicated in the table. The relatively slow conversion rate of the oxides to sulfides meant that even very low sulfiding gas velocities were satisfactory, such as one volume of sulfiding gas per volume of catalyst per hour. The data in Table 4 were obtained while employing a 20 percent nickel-tungsten on alumina catalyst. A fluid catalytically cracked furnace oil distillate such as that described in Table 1 was employed as a charge during the tests. The hydrogenation conditions were 1000 pounds per square inch gauge, 700° F., 1 liquid volume of charge per hour per volume of catalyst and 4000 standard cubic feet per barrel.

As shown in Table 4, the unsulfided catalyst possessed an activity of 570 while all the catalyst samples sulfided between temperatures of 400 and 800° F. possessed activities greater than the unsulfided catalyst. In addition, maximum activities were obtained from the catalyst samples sulfided between 600 and 700° F.

TABLE 4

*Effect of sulfiding temperature on relative activity of nickel-tungsten-alumina*

| Sulfiding Temperature | Unsulfided Catalyst (Reference) | Sulfided Catalyst |
|---|---|---|
| 200 | 570 | 564 |
| 400 | 570 | 603 |
| 600 | 570 | 620 |
| 700 | 570 | 620 |
| 800 | 570 | 578 |

We have also found that at these increased sulfiding temperatures a critical range of sulfiding time duration exists within which optimum promotion is obtained. This effect of sulfiding time duration is illustrated in Table 5. The catalyst compositions, sulfiding gas composition, and hydrogenation conditions employed in obtaining the data shown in Table 5 were the same as those outlined for the tests illustrated in Table 4.

TABLE 5

*Effect of sulfiding time on relative activity of nickel-tungsten-alumina*

| Sulfiding Time—Hours | Unsulfided Catalyst (Reference) | Catalyst Sulfided at 400° F. | Catalyst Sulfided at 600° F. |
|---|---|---|---|
| 1 | 570 | 600 | 577 |
| 4 | 570 | 603 | 620 |
| 12 | 570 | | 616 |
| 24 | 570 | 599 | 591 |

Table 5 shows that when a catalyst is sulfided at 400° F., substantially no increase in catalyst activity is achieved by extending the sulfiding time more than one hour. However, when a catalyst is sulfided at 600° F., optimum promotion is achieved by employing a sulfiding time duration of 4 to 12 hours. As shown in Table 5, employing a sulfiding temperature of 600° F. for 4 hours results in approximately a 50 percent greater activity increase due to sulfiding than is realized by sulfiding at 400° F. for 4 hours.

The sulfiding gas mixture contains from 1 to 99 percent of hydrogen sulfide. A reducing agent, such as hydrogen, and a sulfiding agent, such as hydrogen sulfide, are both present since the combination is better than either alone. Other reducing agents, such as carbon monoxide, and other sulfiding agents, such as organic sulfur compounds can also be employed. Table 6 shows data obtained by employing similar catalysts and process conditions to those indicated for Table 4. The catalyst of Table 6 was sulfided at 600° F. for four hours with the various gas compositions indicated.

TABLE 6

*Effect of hydrogen to hydrogen sulfide volume ratio on relative activity of nickel-tungsten-alumina*

| Hydrogen-to-Hydrogen Sulfide, Volume Ratio | Unsulfided Catalyst (Reference) | Relative Activity |
|---|---|---|
| 0 | 570 | 529 |
| 2 | 570 | 616 |
| 12 | 570 | 620 |
| ∞ | 570 | 552 |

It is seen from Table 6 that when a hydrogen-hydrogen sulfide mixture is employed best results are achieved by employing a mixture which has neither too small nor too large a ratio of hydrogen-to-hydrogen sulfide. Table 6 indicates that good results are achieved by employing a hydrogen-to-hydrogen sulfide volume ratio of between approximately 2 and 12.

An oxided nickel-tungsten-molybdenum-alumina catalyst was prepared containing 2.1 percent nickel, 8.9 percent tungsten, and 9.0 percent molybdenum on Alcoa H-41 alumina, the preparation technique being a double impregnation in which all but 5.0 percent molybdenum was added in the first impregnation. This catalyst possessed an activity of 528 at a reaction pressure of about 1000 pounds per square inch gauge. After regeneration the catalyst was sulfided at approximately 400° F. for about one hour and the resulting catalyst showed a relative activity of 626 under the same reaction conditions used previously. The same catalyst was sulfided again after regeneration according to the preferred sulfiding conditions of this invention and the resulting catalyst had an activity of 655 under similar reaction conditions. It is seen that operating under the sulfiding conditions of this invention results in an improved catalyst activity.

The catalyst supports of this invention can be impregnated by any suitable method. For example, these supports may be impregnated by either multiple impregnation or single impregnation of the active metals. However, it is preferable that multiple impregnation be employed wherein the tungsten is deposited on the carrier first. It was found that when the tungsten is impregnated upon the carrier before the group VIII metal or metals, a catalyst is produced which has an increased activity as compared to a similar catalyst prepared by simultaneous impregnation. On the other hand, it was found that when the group VIII metal is impregnated upon the carrier before the tungsten, the resulting catalyst has inferior activity as compared to a similar catalyst prepared by simultaneous impregnation.

Table 7 shows the effect of variations in order of impregnation of active metals on the relative activity of 25 percent 1:1 nickel-tungsten on alumina catalysts. Catalysts having this composition were sulfided under the preferred sulfiding conditions of this invention. They were tested on a fluid catalytically cracked furnace oil distillate charge at a space velocity of one liquid volume per hour per volume of catalyst, a temperature of 700° F., a pressure of 1000 pounds per square inch gauge and a hydrogen rate of 4000 standard cubic feet per barrel.

TABLE 7

*Effect of variations in preparation technique on relative activity of sulfided nickel-tungsten-alumina*

| Preparation Technique | Relative Activity |
|---|---|
| Single impregnation—Tungsten and Nickel together | 608 |
| Double impregnation—tungsten first | 634 |
| Double impregnation—nickel first | 592 |

Table 7 shows that in the case of the catalyst which was prepared by impregnating nickel and tungsten upon the carrier simultaneously, the relative activity was 608. In the case of the catalyst prepared by impregnating tungsten first, the activity was 634; while in the case of the catalyst prepared by impregnating nickel first the activity was only 592. Therefore, the catalyst prepared by impregnating tungsten first exhibited a higher activity than either of the other two catalysts.

Unsupported metal sulfides, such as nickel-tungsten-sulfide, are initially somewhat more active for the saturative hydrogenation of aromatics than the supported oxided or sulfided catalysts of this invention. However, the unsupported sulfides are only preferable where catalyst regeneration is not required or in applications where catalyst life is unusually long. The reason for this is that the activity of the unsupported catalyst cannot be restored to more than a small fraction of its initial value of aromatic saturative hydrogenation activity by the usual catalyst regeneration procedures.

In contrast to the unsupported catalysts which contain large proportions of active metals, the supported catalysts of this invention contain only about 20–30 percent active metals yet possess about 90 percent as much activity for the saturation of aromatics and, in addition, maintain their high activity characteristics after repeated regenerations. The data shown in Table 8 show the effect of regeneration on the relative activity of a 20 percent alumina supported nickel-tungsten-oxide catalyst. This catalyst was employed in the hydrogenation treatment of a fluid catalytically cracked furnace oil distillate at 700° F., 1000 pounds per square inch gauge, a space velocity of 1 liquid volume of charge per hour per volume of catalyst and a hydrogenation rate of 4000 standard cubic feet per barrel for a throughput of 20 volumes of charge per volume of catalyst between each regeneration. The catalyst was regenerated 14 times. Table 8 shows the relative activity of the catalyst for the saturation of aromatics at the outset and after the first and fourteenth regenerations.

TABLE 8

*Effect of regeneration on the relative activity of alumina supported nickel-tungsten oxide*

| Number of regenerations | Relative Activity |
|---|---|
| 0 | 570 |
| 1 | 557 |
| 14 | 547 |

The data in Table 8 show that after fourteen regenerations the catalyst experienced an activity loss of only about 4 percent. Since an activity decline of better than 2 percent occurs as a result of one regeneration, the aging due to regeneration of the supported catalysts of this invention consists of a small but sharp initial decline followed by a period of very gradual aging. The regenerative procedure followed in obtaining the data shown in Table 8 consisted in the use of an air-steam mixture upon the catalyst at a temperature of 1050° F. This procedure primarily removes carbon formation from the catalyst surface and pores. Following regeneration, the catalyst is preferably resulfided as described above.

In the preparation of a preferred sulfided nickel-tungsten containing catalyst having nickel and tungsten in a 1:1 atomic ratio and containing 5.42 weight percent nickel and 15.88 weight percent tungsten on H–44 alumina support the support which exists initially as a powder is pelleted, broken to 10–20 mesh size and then calcined at 1000° F. for ten hours. An aqueous solution of ammonium meta tungstate is prepared by slurrying finely divided tungstic acid ($WO_3 \cdot H_2O$) in water. Aqueous ammonium hydroxide solution is added to the slurry with stirring and the mixture is then allowed to stand at room temperature for two hours. It is then heated to boiling, cooled, and filtered to remove any insoluble material. The mixture is impregnated upon the support under a vacuum for five minutes and then the impregnated carrier is subjected to atmospheric pressure for ten minutes. Excess liquid is drained from the carrier and it is dried at 250° F. for 24 hours followed by calcining at 1000° F. for 10 hours. A solution of nickel nitrate is then prepared by placing nickel nitrate ($Ni(NO_3)_2 \cdot 6H_2O$) in distilled water. This solution is impregnated upon the carrier under the same conditions as the ammonium meta tungstate impregnation followed by a similar drying and calcining operation. The catalyst is then sulfided by passing a hydrogen-hydrogen sulfide containing mixture, having a volumetric ratio of hydrogen to hydrogen sulfide of 4, over the catalyst at a temperature of 650° F. for a time duration of six hours.

The saturation of aromatics according to this invention may be performed concomitantly with other reactions. For example, if a process is desired which will result in both aromatic saturation and cracking, the catalysts of this invention may be employed with a cracking type support. Also, it is preferable to carry out processes using this catalyst continuously and it is desirable that a space velocity of 0.4 to 20.0 liquid volumes of charge per hour per volume of catalyst be employed.

EXAMPLE 1

A fluid catalytically cracked furnace oil distillate (400°–650° F.) was treated in the presence of an unsulfided nickel-tungsten on H-44 alumina catalyst. The catalyst contained 21.30 percent nickel plus tungsten in a 1:1 molal ratio. The hydrogenation conditions were 700° F., 990 pounds per square inch gauge, 4.07 liquid volumes of charge per hour per volume of catalyst, and 2190 standard cubic feet of hydrogen per barrel of charge. Product data were taken after a throughput of 40.7 volumes of charge per volume of catalyst. The following inspection data of charge and product show a decrease in the average number of aromatic rings per molecule from 0.95 to 0.65.

|  | Charge | Product |
| --- | --- | --- |
| ° API | 24.3 | 29.1 |
| Sulfur, Percent | 1.55 | 0.08 |
| Average Number Rings per molecule | 1.64 | 1.64 |
| Average Number Aromatic Rings per molecule | 0.95 | 0.65 |
| Refractive Index | 1.6169 | 1.4942 |

EXAMPLE 2

A Taparito heavy gas oil (670°–1030° F.) was treated in the presence of a presulfided nickel-tungsten on H-44 alumina catalyst containing 24.1 percent by weight of nickel and tungsten in a 1:1 molal ratio. The hydrotreating conditions were 700° F., 1000 pounds per square inch gauge, 1.08 liquid volumes of charge per hour per volume of catalyst and 3820 standard cubic feet of hydrogen per barrel. Product data were taken after a 15.1 volume throughput. The following data shows a change in average number of aromatic rings per molecule from 1.37 to 0.79 during the treatment.

|  | Charge | Product |
| --- | --- | --- |
| ° API | 18.4 | 23.5 |
| Sulfur, Percent | 2.25 | 0.29 |
| Aniline Point, ° F | 161.9 | 184.0 |
| Carbon Residue, Conradson, Percent | 1.43 | 0.25 |
| Vanadium, p.p.m | 8.5 | <0.1 |
| Average No. Rings per molecules | 3.10 | 2.88 |
| Average No. Aromatic Rings per molecules | 1.37 | 0.79 |

EXAMPLE 3

A Mid-Continent vacuum bottoms feed containing 7 percent by volume of crude was treated in the presence of a presulfided nickel-tungsten on alumina catalyst containing 22.8 percent of nickel and tungsten in a 1:1 molal ratio. The hydrogenation conditions were 791° F., 2950 pounds per square inch gauge, 0.52 liquid volumes of charge per hour per volume of catalyst and 4350 standard cubic feet of hydrogen per barrel. The product data was taken after a 45.4 volume throughput. The inspection data for the charge and product is shown below.

|  | Charge | Product |
| --- | --- | --- |
| ° API | 11.6 | 19.0 |
| Viscosity, SUV at 130° F | 151,126 | 1,368 |
| Sulfur, Percent | 0.92 | 0.17 |
| Carbon Residue, Conradson, Percent | 17.27 | 8.48 |
| Insoluble in n-pentane, Percent | 10.04 | 4.91 |
| Vanadium, p.p.m | 58.0 | 3.5 |
| Nickel, p.p.m | 33.0 | 4.9 |

The inspection data shows that the material insoluble in normal pentane decreased from 10.04 percent to 4.91 percent. The material insoluble in n-pentane comprises to a large extent asphaltenes which contain multiple fused aromatic rings and therefore a decrease in the amount of material soluble in n-pentane indicates a corresponding decrease in the amounts of aromatics present in the oil.

EXAMPLE 4

A shale oil coker distillate (250°–750° F.) was treated in the presence of a presulfided 24.5 percent nickel-tungsten on H-44 alumina catalyst containing 24.5 percent nickel and tungsten in a 1:1 molal ratio. The saturation conditions were 774° F., 1000 pounds per square inch gauge, 0.49 liquid volumes of charge per volume of catalyst and 1970 standard cubic feet of hydrogen per barrel. Product data were obtained after a throughput of 17.7 volumes of charge per volume of catalyst. Following are the inspection data of the charge and treated product.

|  | Charge | Product |
| --- | --- | --- |
| ° API | 25.3 | 37.8 |
| Sulfur, Percent | 0.68 | <0.04 |
| Nitrogen, Percent | 1.93 | 0.44 |
| Oxygen, Percent | 1.38 | 0.64 |
| Carbon Residue, Conradson, Percent | 1.04 | <0.01 |
| Aniline Point, ° F | 93.0 | 146.0 |

The data shows that the aniline point increased from 93.0° F. to 146.0° F. as a result of the treatment. The aniline point is a measure of the temperature which is required for a mixture of oil sample and aniline to go into solution and an increase in aniline point signifies a decrease in the amount of aromatics present.

EXAMPLE 5

A lubricating oil fraction which was solvent extracted and centrifuged was treated in the presence of a nickel-tungsten on H-44 alumina catalyst containing 23.8 percent nickel and tungsten in a 1:1 molal ratio. The catalyst was not presulfided. The hydrotreating conditions were 648° F., 1000 pounds per square inch gauge, 0.5 liquid volumes of charge per hour per volume of catalyst and 2000 standard cubic feet of hydrogen per barrel. Following is a tabulation of the charge and product specifications.

|  | Charge | Product |
| --- | --- | --- |
| ° API | 25.3 | 25.8 |
| Viscosity, SUV at 210° F | 161 | 155 |
| Color, ASTM Union | 4 (Dilute) | 3.5 |
| Carbon Residue, Conradson, Percent | 0.88 | 0.48 |
| Iodine No | 11.5 | 8.3 |

The data shows that the iodine number decreased from 11.5 to 8.3 as a result of the treatment. Since iodine number is an indication of the amount of unsaturation present, including aromatic unsaturation, a decrease in iodine number is indicative of a decrease in the amount of aromatics present.

Various changes and modifications can be made without departing from the spirit of this invention and the scope thereof as defined in the following claims.

We claim:

1. A process comprising passing an aromatic containing material and hydrogen at a temperature of 550° to 850° F. and a pressure of 500 to 4000 pounds per square inch gauge over a sulfided catalyst comprising between about 15 and 26 percent by weight of tungsten and nickel supported upon alumina, said catalyst prepared by impregnating the alumina with tungsten before impregnating with nickel and sulfiding the metals by passing a mixture containing hydrogen and hydrogen sulfide in a hydrogen-hydrogen sulfide volume ratio between 2:1 and 12:1 over the impregnated metals at a temperature between about 600° and 700° F. for a time duration of about 4 to 12 hours.

2. A process comprising passing an aromatic containing material and hydrogen at a temperature of 550° to 850° F. and a pressure of 500 to 4000 pounds per square inch gauge over a sulfided catalyst comprising between about 15 and 26 percent by weight of tungsten and nickel supported upon alumina, said catalyst prepared by impregnating the alumina with tungsten before impregnating with nickel and sulfiding the metals by passing a mixture containing hydrogen and hydrogen sulfide in a hydrogen-hydrogen sulfide volume ratio between 2:1 and 12:1 over the impregnated metals at a temperature between about 500° F. and 750° F. for a time duration of about 2 to 20 hours.

References Cited in the file of this patent

UNITED STATES PATENTS

| | | |
|---|---|---|
| 1,960,977 | Pier et al. | May 29, 1934 |
| 2,642,463 | Arnold et al. | June 16, 1953 |
| 2,721,226 | Ciapetta et al. | Oct. 18, 1955 |
| 2,744,052 | Nozaki | May 1, 1956 |
| 2,748,241 | Holm | Mar. 5, 1957 |
| 2,821,561 | Pevere et al. | Jan. 28, 1958 |

UNITED STATES PATENT OFFICE
CERTIFICATION OF CORRECTION

Patent No. 2,967,204                                                January 3, 1961

Harold Beuther et al.

It is hereby certified that error appears in the above numbered patent requiring correction and that the said Letters Patent should read as corrected below.

Column 7, line 23, for "50" read -- 500 --.

Signed and sealed this 30th day of May 1961.

(SEAL)
Attest:

ERNEST W. SWIDER                                       DAVID L. LADD
Attesting Officer                                          Commissioner of Patents